(12) United States Patent
Pan

(10) Patent No.: US 8,970,779 B2
(45) Date of Patent: Mar. 3, 2015

(54) CAMERA SYSTEM, CAMERA BODY, AND INTERCHANGEABLE LENS

(71) Applicant: FUJIFILM Corporation, Tokyo (JP)

(72) Inventor: Yi Pan, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/312,829

(22) Filed: Jun. 24, 2014

(65) Prior Publication Data

US 2014/0300808 A1   Oct. 9, 2014

Related U.S. Application Data

(63) Continuation of application No. PCT/JP2012/082028, filed on Dec. 11, 2012.

(30) Foreign Application Priority Data

Dec. 28, 2011   (JP) ................. 2011-289514

(51) Int. Cl.
*H04N 5/225* (2006.01)
*H04N 5/228* (2006.01)
*H04N 5/76* (2006.01)
*G03B 17/14* (2006.01)
*H04N 5/232* (2006.01)

(52) U.S. Cl.
CPC .............. *H04N 5/2254* (2013.01); *G03B 17/14* (2013.01); *H04N 5/23209* (2013.01); *H04N 5/23225* (2013.01)
USPC .. 348/373; 348/335; 348/207.99; 348/231.99

(58) Field of Classification Search
CPC ............ H04N 5/2254; H04N 5/23212; H04N 5/23293; H04N 5/23209; G03B 17/14
USPC ......... 348/335, 240.99, 240.3, 373, 374, 353, 348/231.99, 207.99; 396/529, 530, 532, 396/535, 542
See application file for complete search history.

(56) References Cited

U.S. PATENT DOCUMENTS 6,392,696 B1   5/2002   Onuki
7,796,350 B2*  9/2010   Yumiki et al. ............... 359/808
(Continued)

FOREIGN PATENT DOCUMENTS

| JP | 7-191355 A | 7/1995 |
| JP | 2008-033836 A | 2/2008 |
| JP | 2010-204430 A | 9/2010 |

OTHER PUBLICATIONS

International Preliminary Report on Patentability issued in PCT/JP2012/082028, completed on Oct. 23, 2013.
(Continued)

*Primary Examiner* — Aung S Moe
(74) *Attorney, Agent, or Firm* — Birch, Stewart, Kolasch & Birch, LLP

(57) ABSTRACT

According to an aspect of the present invention, the camera body can switch the present version, which is an original version, to specifications of an older version. Thus, even if the present versions of the camera body and the interchangeable lens doe not have compatibility, if an old version has compatibility, a minimum operation can be ensured by the specifications of the old version without updating the firmware, although the functions may have possibility of being restricted.

11 Claims, 11 Drawing Sheets

(56) References Cited

U.S. PATENT DOCUMENTS

| | | | |
|---|---|---|---|
| 8,745,609 B2* | 6/2014 | Oka | 717/168 |
| 2006/0092312 A1* | 5/2006 | Tanaka | 348/340 |
| 2008/0028386 A1 | 1/2008 | Nagamine et al. | |
| 2011/0145804 A1* | 6/2011 | Oka | 717/168 |
| 2012/0212648 A1* | 8/2012 | Oka | 348/231.99 |
| 2013/0141632 A1* | 6/2013 | Shintani et al. | 348/353 |

OTHER PUBLICATIONS

International Search Report issued in PCT/JP2012/082028, mailed on Feb. 19, 2013.
Written Opinion issued in PCT/JP2012/082028, mailed on Feb. 19, 2013.

* cited by examiner

FIG.4

| ITEM | VARIABLE | REFERENT ADDRESS |
|---|---|---|
| PRODUCT NAME | Lens_Name | NAME0~63 |
| FIRMWARE MAJOR VERSION | Lens_FWMajorVer | LENS_FW_VER_MAJOR |
| FIRMWARE MINOR VERSION | Lens_FWMinorVer | LENS_FW_VER_MINOR |
| MOUNT SYSTEM MAJOR VERSION | Lens_MountMajorVer | LENS_MOUNT_VER_MAJOR |
| MOUNT SYSTEM MINOR VERSION | Lens_MountMinorVer | LENS_MOUNT_VER_MINOR |

FIG.5

| ITEM | VARIABLE | REFERENT ADDRESS |
|---|---|---|
| PRODUCT NAME | Body_Name | NAME0~14 |
| FIRMWARE MAJOR VERSION | Body_FWMajorVer | BODY_FW_VER_MAJOR |
| FIRMWARE MINOR VERSION | Body_FWMinorVer | BODY_FW_VER_MINOR |
| MOUNT SYSTEM MAJOR VERSION | Body_MountMajorVer | BODY_MOUNT_VER_MAJOR |
| MOUNT SYSTEM MINOR VERSION | Body_MountMinorVer | BODY_MOUNT_VER_MINOR |

SWITCHABLE VERSIONS OF
BODY FIRMWARE

SWITCHABLE VERSION OF
LENS FIRMWARE

CAMERA SYSTEM, CAMERA BODY, AND INTERCHANGEABLE LENS

CROSS-REFERENCE TO RELATED APPLICATIONS

This application is a Continuation of PCT International Application No. PCT/JP2012/082028 filed on Dec. 11, 2012, which claims priority under 35 U.S.C. §119(a) to Japanese Patent Application No. 2011-289514 filed on Dec. 28, 2011. Each of the above application(s) is hereby expressly incorporated by reference, in its entirety, into the present application.

BACKGROUND OF THE INVENTION

1. Field of the Invention

The present invention relates to a camera system, camera body, and interchangeable lens and, in particular, an interchangeable lens camera system with a camera body (camera body) and an interchangeable lens attachable to and detachable from the camera body, the camera body, and the interchangeable lens.

2. Description of the Related Art

Conventionally, interchangeable lens cameras where an interchangeable lens is attachable to and detachable from a camera body (hereinafter referred to as a body) have been known, and those where communications and the like are performed between the body and the interchangeable lens have also been known. In the cameras of these types, by engaging a lens mount on an interchangeable lens side with a body mount on a body side, the interchangeable lens is mechanically mounted on the body and also electrically connected thereto and, with the interchangeable lens mounted on the body, a camera system operating similarly to an integrated camera is constructed.

Also, in a known camera system where communications are performed between the body and the interchangeable lens, the interchangeable lens has stored therein information about its optical specifications and electrical specifications as lens information. In this camera system, the body obtains the lens information from the interchangeable lens mounted on the body, thereby appropriately performing optical adjustment regarding focus, zoom, iris, and others, image processing, etc., conforming to the optical specifications and electrical specifications of the interchangeable lens.

Furthermore, a camera system has been known where the body and the interchangeable lens are configured to each operate according to firmware incorporated therein and the version of the firmware is updated to add a new function, improve the operation, rectify a fault, etc.

Japanese Patent Application Laid-Open No. 2010-204430 discloses a camera system as described above. According to this, it is disclosed that, when the version of firmware of the camera body and the version of firmware of the interchangeable lens mounted on the camera body are incompatible with each other, the version of the firmware of the body or the interchangeable lens is updated to a version compatible with that of the other firmware, thereby allowing an operation in combination of the body and the interchangeable lens.

SUMMARY OF THE INVENTION

Meanwhile, when the versions of the body and the interchangeable lens mounted on the body are incompatible with each other as in Japanese Patent Application Laid-Open No. 2010-204430, if the firmware of the body or the interchangeable lens is updated, it takes time to update, and also it is required to previously store firmware for that update in a memory readable by the body or the interchangeable lens.

However, depending on the circumstances, it may not be desired to take time for updating the firmware. Also, for example, when a plurality of types of interchangeable lens are used for one body, if the firmware of the body is updated in order to ensure an operation in combination with a predetermined interchangeable lens, compatibility with the version of the firmware of another interchangeable lens is lost, and it may be possible that circumstances occur such that the firmware of the other interchangeable lens have to be updated, which is burdensome for some users.

Furthermore, when the versions of current firmware of the body and the interchangeable lens are incompatible with each other and a combination of these does not allow any operation, an older version of the body or the interchangeable lens or older versions of both pieces of firmware are used, an operation regarding a function of a minimum function is possible even if an operation regarding a part of functions is restricted. Depending on the user, this can be sufficient with that.

However, even under these circumstances, the operation in combination with these body and interchangeable lens is completely disabled unless the firmware of at least the body or the interchangeable lens is updated. Moreover, also if a version compatible with the current version of the firmware of the body or the interchangeable lens is not present, the operation in combination of these body and interchangeable lens is disadvantageously completely disabled.

The present invention was made in view of these situations, and has an object of providing a camera system without updating firmware even if a current version of the firmware of a camera body and a current version of the firmware of an interchangeable lens mounted on the camera body, the camera system capable of allowing an operation in combination of these camera body and the interchangeable lens even by restricting an operable function; the camera body; and the interchangeable lens.

To achieve the object described above, a camera body according to the present invention configuring a camera system which includes the camera body and an interchangeable lens attachably and detachably mounted on the camera body, the interchangeable lens having lens firmware storage means which has stored therein data of lens firmware of a predetermined version for operating the interchangeable lens, with the predetermined version being taken as a present version, the lens firmware capable of switching to specifications of either one of the present version and one or plurality of old versions older than the present version, the camera body including body firmware storage means included in the camera body, the body firmware storage means having stored therein data of body firmware of a predetermined version for operating the camera body, the body firmware capable of switching to specifications of either one of the present version and one or plurality of old versions older than the present version, compatibility information storage means which has stored therein compatibility information indicating presence or absence of compatibility between each of the present version and the old versions that are switchable of the body firmware stored in the body firmware storage means and each of the present version and the old version that are switchable of the lens firmware stored in the lens firmware storage means, compatible version selecting means which selects, based on the compatibility information stored in the compatibility information storage means, a version of the body firmware and a version of the lens firmware with mutual compatibility between the present version and the old versions that are switchable of the body firmware stored in the body firmware storage means and the present version and the old versions that are switchable of the lens firmware stored in the lens firmware storage means, and version switching means which switches the body firmware for operating the camera body to specifications of the version of the body firmware selected by the compatible version selecting means and switches the lens firmware for operating the interchangeable lens to specifications of the version of the lens firmware selected by the compatible version selecting means when the present version of the body firmware and the present version of the lens firmware do not have compatibility.

According to the present invention, the camera body can switch the present version, which is an original version, to specifications of an older version. Thus, even if the present versions of the camera body and the interchangeable lens doe not have compatibility, if an old version has compatibility, a minimum operation can be ensured by the specifications of the old version without updating the firmware, although the functions may have possibility of being restricted.

Also, the present invention can take a mode including determining means which determines, based on the compatibility information stored in the compatibility information storage means, whether a present version newer than the present version of the body firmware version stored in the body firmware storage means or the present version of the lens firmware version stored in the lens firmware storage means is present; and notifying means which makes a notification for promoting update of the firmware when it is determined by the determining means that the present version newer than the present version of the body firmware version stored in the body firmware storage means or the present version of the lens firmware version stored in the lens firmware storage means is present.

According to this mode, if the firmware of the camera body or the interchangeable lens is updatable (if the version of the camera body or the interchangeable lens is upgradable), it is possible to promote update at user's convenience.

Furthermore, a camera system according to the present invention includes a camera body, a interchangeable lens attachably and detachably mounted on the camera body, body firmware storage means included in the camera body, the body firmware storage means having stored therein data of body firmware of a predetermined version for operating the camera body, with the predetermined version being taken as a present version, the body firmware capable of switching to specifications of either one of the present version and one or plurality of old versions older than the present version, the body firmware storage means included in the camera body, lens firmware storage means which has stored therein data of lens firmware of a predetermined version for operating the interchangeable lens, with the predetermined version being taken as a present version, the lens firmware capable of switching to specifications of either one of the present version and one or plurality of old versions older than the present version, the lens firmware storage means included in the interchangeable lens, compatibility information storage means which has stored therein compatibility information indicating presence or absence of compatibility between each of the present version and the old versions that are switchable of the body firmware stored in the body firmware storage means and each of the present version and the old version that are switchable of the lens firmware stored in the lens firmware storage means, compatible version selecting means which selects, based on the compatibility information stored in the compatibility information storage means, a version of the body firmware and a version of the lens firmware with mutual compatibility between the present version and the old versions that are switchable of the body firmware stored in the body firmware storage means and the present version and the old versions that are switchable of the lens firmware stored in the lens firmware storage means, and version switching means which switches the body firmware for operating the camera body to specifications of the version of the body firmware selected by the compatible version selecting means and switches the lens firmware for operating the interchangeable lens to specifications of the version of the lens firmware selected by the compatible version selecting means when the present version of the body firmware and the present version of the lens firmware do not have compatibility.

According to the present invention, the firmware of the camera body and the interchangeable lens can be switched from the present version, which is an original version, to specifications of an older version. Thus, even if the present versions of the camera body and the interchangeable lens doe not have compatibility, if an old version has compatibility, a minimum operation can be ensured by the specifications of the old version without updating the firmware, although the functions may have possibility of being restricted.

Still further, the present invention can take a mode including determining means which determines, based on the compatibility information stored in the compatibility information storage means, whether a present version newer than the present version of the body firmware version stored in the body firmware storage means or the present version of the lens firmware version stored in the lens firmware storage means is present, and notifying means which makes a notification for promoting update of the firmware when it is determined by the determining means that the present version newer than the present version of the body firmware version stored in the body firmware storage means or the present version of the lens firmware version stored in the lens firmware storage means is present.

According to this mode, if the firmware of the camera body or the interchangeable lens is updatable (if the version of the camera body or the interchangeable lens is upgradable), it is possible to promote update at user's convenience.

Still further, in the present invention, the compatibility information storage means includes compatibility information storage means included in the camera body and the compatibility information storage means included in the interchangeable lens, the compatibility information storage means included in the camera body has stored therein, correspondingly to each of present versions published as lens firmware for operating the interchangeable lens, compatibility information indicating presence or absence of compatibility between each of the present versions and the old versions that are switchable of the lens firmware of each of the present versions and each of the present versions and the old versions that are switchable of the body firmware stored in the body firmware storage means, and the compatibility information storage means included in the interchangeable lens has stored therein, correspondingly to each of present versions published as camera body firmware for operating the camera body, compatibility information indicating presence or absence of compatibility between each of the present versions and the old versions that are switchable of the body firmware of each of the present versions and each of the present versions and the old versions that are switchable of the lens firmware storage means, the compatible version selecting means includes mount system version obtaining means which obtains information about a body mount system version representing specifications on the camera body side of a mount system for mounting the interchangeable lens on the camera body and a lens mount system version representing specifications on the interchangeable lens side thereof, lens firmware version obtaining means which obtains information about the present version of the lens firmware stored in the lens firmware storage means, and body firmware version obtaining means which obtains information about the present version of the body firmware stored in the body firmware storage means, between the body mount system version and the lens mount system version obtained by the mount system version obtaining means, when the body mount system version is newer, the compatibility information corresponding to the present version of the lens firmware obtained by the lens firmware version obtaining means is obtained from the compatibility information storage means included in the camera body and, based on the obtained compatibility information, a version of the body firmware and a version of the lens firmware having the mutual compatibility are selected, and between the body mount system version and the lens mount system version obtained by the mount system version obtaining means, when the lens mount system version is newer, the compatibility information corresponding to the present version of the body firmware obtained by the body firmware version obtaining means is obtained from the compatibility information storage means included in the interchangeable lens and, based on the obtained compatibility information, a version of the body firmware and a version of the lens firmware having the mutual compatibility are selected.

According to this mode, each of the camera body and the interchangeable lens has compatibility information of the firmware version. Here, between the camera body and the interchangeable lens, only the one with a newer mount system version may have compatibility information corresponding to its own model. Therefore, a firmware version with compatibility is selected based on the compatibility information on a mode side with the newer mount system version.

In the present invention, the compatible version selecting means includes compatible version selecting means included in the camera body and the compatible version selecting means included in the interchangeable lens, the compatible version selecting means included in the camera body has the lens firmware version obtaining means which obtains the present version of the lens firmware from the body information transmitted from the interchangeable lens to the camera body, the compatible version selecting means included in the interchangeable lens has the lens firmware version obtaining means which obtains the present version of the body firmware from camera information transmitted from the camera body to the interchangeable lens, between the body mount system version and the lens mount system version obtained by the mount system version obtaining means, when the body mount system version is newer, the version of the body firmware and the version of the lens firmware having the mutual compatibility are selected by the compatible version selecting means included in the camera body, and between the body mount system version and the lens mount system version obtained by the mount system version obtaining means, when the lens mount system version is newer, the version of the body firmware and the version of the lens firmware having the mutual compatibility are selected by the compatible version selecting means included in the interchangeable lens.

According to this mode, the compatible version selecting means which selects a version of firmware with compatibility is included in each of the camera body and the interchangeable lens. And, when the mount system version of the camera body is newer than that of the interchangeable lens, the compatibility information stored in the camera body is used, and therefore a version with compatibility is selected by the compatible version electing means of the camera body. When the mount system version of the interchangeable lens is newer, the compatibility information stored in the interchangeable lens is used, and therefore a version with compatibility is selected by the compatible version electing means of the interchangeable lens. Therefore, it is not required to exchange the compatibility information for use in version selection between the camera body and the interchangeable lens.

The present invention can take a mode including determining means which determines, when the body mount system version is newer between the body mount system version and the lens mount system version obtained by the mount system version obtaining means, whether a present version newer than the present version of the lens firmware obtained by the lens firmware version obtaining means is present, based on the compatibility information stored in the compatibility information storage means included in the camera body, and determines, when the lens mount system version is newer between the body mount system version and the lens mount system version obtained by the mount system version obtaining means, whether a present version newer than the present version of the body firmware obtained by the body firmware version obtaining means is present, based on the compatibility information stored in the compatibility information storage means included in the interchangeable lens, and notifying means which makes a notification for promoting update of the lens firmware when it is determined by the determining means that the present version newer than the lens firmware stored in the lens firmware storage means is present, and makes a notification for promoting update of the body firmware when it is determined by the determining means that the present version newer than the body firmware stored in the body firmware storage means is present.

According to this mode, if the firmware of the camera body or the interchangeable lens is updatable (if the version of the camera body or the interchangeable lens is upgradable), it is possible to promote update at user's convenience.

In the present invention, the compatibility information storage means included in the camera body has stored therein the compatibility information corresponding to each model of an existing interchangeable lens, the compatibility information storage means included in the interchangeable lens has stored therein the compatibility information corresponding to each model of an existing camera body, the compatible version selecting means includes body model information obtaining means which obtains information about the model of the camera body configuring the camera system, and lens model information obtaining means which obtains information about the model of the interchangeable lens configuring the camera system, between the body mount system version and the lens mount system version obtained by the mount system version obtaining means, when the body mount system version is newer, compatibility information corresponding to the model of the interchangeable lens obtained by the lens model information obtaining means is referred to from among the compatibility information stored in the compatibility information storage means included in the camera body, and between the body mount system version and the lens mount system version obtained by the mount system version obtaining means, when the lens mount system version is newer, compatibility information corresponding to the model of the camera body obtained by the body model information obtaining means is referred to from among the compatibility information stored in the compatibility information storage means included in the interchangeable lens.

According to this mode, an example of a specific mode is depicted, which allows a plurality of models to be supported regarding the camera body and the interchangeable lens.

The present invention can take a mode such that, when a plurality of sets of the version of the body firmware and the version of the lens firmware with mutual compatibility are present, the compatible version selecting means selects versions of a set in which at least one of the version of the body firmware and the version of the lens firmware is a latest version, from out of the sets of these versions.

According to this mode, when a plurality of sets of versions with compatibility are present, operation is performed with a version as new as possible.

According to the present invention, even if the current version of the firmware of the camera body and the current version of the firmware of the interchangeable lens mounted on the camera body do not have compatibility, an operation in combination of the camera body and the interchangeable lens can be performed without updating the firmware even though restricting an operable function.

BRIEF DESCRIPTION OF THE DRAWINGS

FIG. 4 is a table exemplarily depicting types of lens information, variable names to which data is set, and variable names of addresses where data is stored.

FIG. 5 is a table exemplarily depicting types of body information, variable names to which data is set, and variable names of addresses where data is stored.

DETAILED DESCRIPTION OF THE EMBODIMENTS

Embodiments for implementing the camera system, camera body, and interchangeable lens according to the present invention are described in detail below according to the attached drawings.

<Structure of Camera System>

Figure 1:
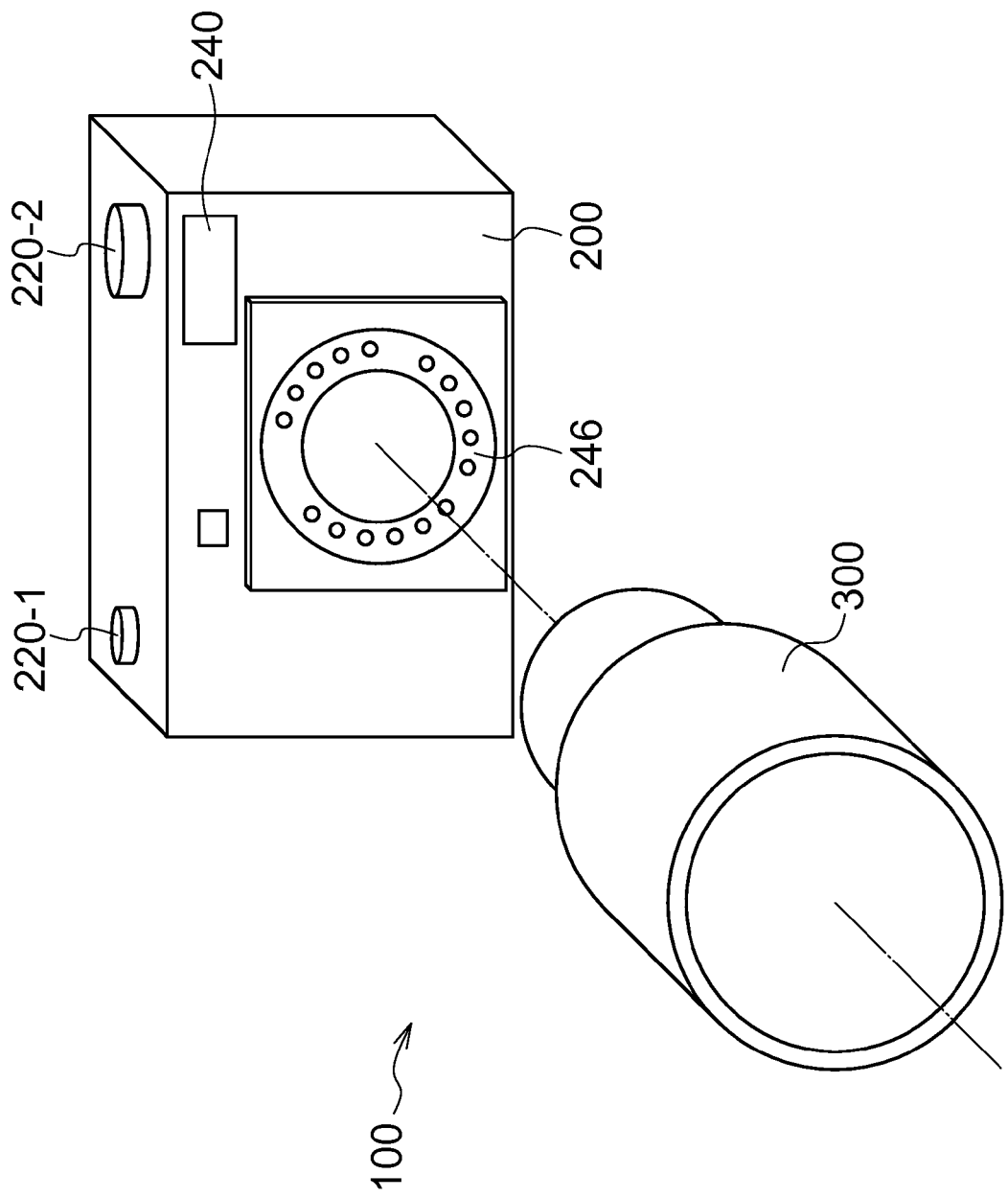
FIG. 1 is an external view of a camera system according to an embodiment of the present invention.

FIG. 1 is a perspective view of the outer appearance of a camera system (imaging device) 100 according to an embodiment of the present invention. The camera system 100 is configured of a camera body (imaging device body) 200 and an interchangeable lens (lens device) 300 to be interchangeably mounted on the camera body 200. With a body mount 246 included in the camera body 200 and a lens mount 346 on an interchangeable lens 300 side corresponding to the body mount 246 coupled together, the camera body 200 and the interchangeable lens 300 are interchangeably mounted. Also, in addition to the body mount 246, a flash 240 is provided on the front surface of the camera body 200. On the upper surface, a release button 220-1 and a dial for photographing mode setting 220-2 are provided.

Figure 2:
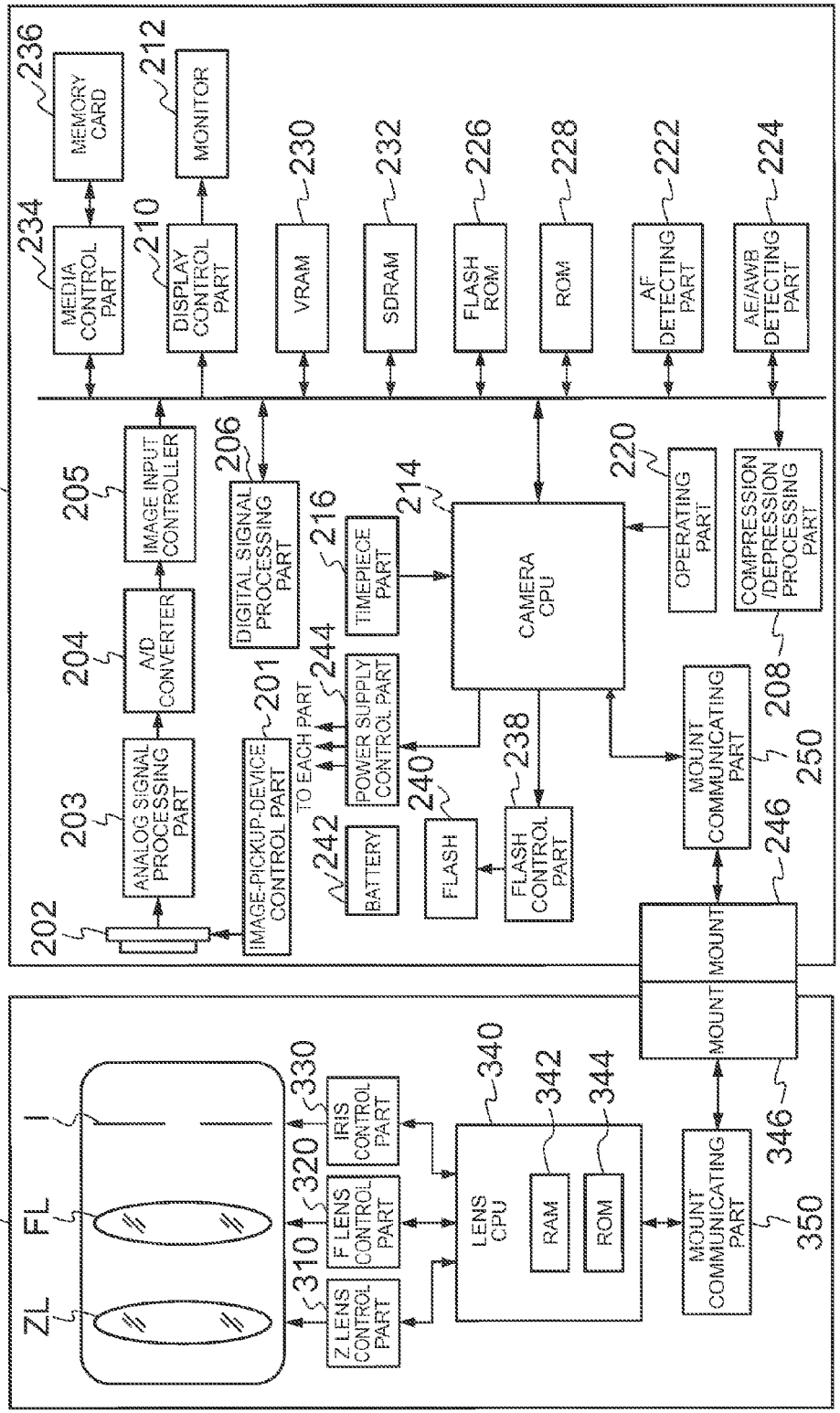
FIG. 2 is a block diagram of the structure of main parts of the camera system.

FIG. 2 is a block diagram of the structure of main parts of the camera system 100. The operation of the camera system 100 is controlled in a centralized manner by a camera CPU 214 of the camera body 200 and a lens CPU 340 of the interchangeable lens 300. Programs (including programs for driving a zoom lens ZL, a focus lens FL, and an iris I) and data required for the operation of the camera CPU 214 are stored in a flash ROM 226 and a ROM (EEPROM) 228 (corresponding to body firmware storage means and compatibility information storage means) of the camera body 200 as data of firmware causing the camera body 200 to operate. Programs (including programs for driving the zoom lens ZL, the focus lens FL, and the iris I) and data required for the operation of the lens CPU 340 are stored in a ROM 344 (corresponding to lens firmware storage means and compatibility information storage means) of the lens CPU 340 as data of firmware causing the interchangeable lens 300 to operate.

The camera body 200 is provided with an operating part 220 including, in addition to the release button 220-1 and the dial 220-2, a replay button, a MENU/OK key, a cross key, a BACK key, etc. By operating a button or key included in the operating part 220, a user can make instructions for selecting a photographing/replay mode; starting photographing; selecting, replaying, or deleting an image; and making a zooming instruction, etc. A signal from the operating part 220 is inputted to the camera CPU 214, and the camera CPU 214 controls each circuit of the camera body 200 based on the input signal and, as will be described further below, also transmits and receives signals to and from the interchangeable lens 300 via the body mount 246 and a mount communicating part 250.

The body mount 246 is provided with terminals, and the lens mount 346 is provided with terminals. When the interchangeable lens 300 is mounted on the camera body 200, corresponding terminals make contact with each other to allow communications.

The above-described terminals include, for example, a ground terminal, a synchronizing signal terminal, a serial communication terminal, a control status communication terminal, and a power supply terminal from a battery 242 of the camera body 200 to each part of the interchangeable lens 300.

In a photographing mode, an image of subject light is formed on a light-receiving surface of an image pickup device 202 of the camera body 200 via the zoom lens ZL, the focus lens FL, and the iris I of the interchangeable lens 300. While the image pickup device 202 is of a CMOS type in the present embodiment, the type is not restricted to the CMOS type, and may be a CCD type. The zoom lens ZL, the focus lens FL, and the iris I are driven by a zoom lens control part 310, a focus lens control part 320, and an iris control part 330, respectively, that are controlled by the lens CPU 340, thereby performing focus control, zoom control, and iris control.

Following an instruction from the lens CPU 340, the zoom lens control part 310 moves the zoom lens ZL in an optical axis direction to make a photographing magnification variable. Also, following an instruction from the lens CPU 340, the focus lens control part 320 causes the focus lens FL to make a proceeding/receding motion in the optical axis direction to focus the subject. Following an instruction from the lens CPU 340, the iris control part 330 changes an iris value of the iris I.

When the release button 220-1 is pressed down in a first stage (pressed halfway down), the camera CPU 214 starts AF and AE operations. Accordingly, image data outputted from an A/D converter 21 is captured into an AE/AWB detecting part 224. The camera CPU 214 calculates brightness (a photographing Ev value) of the subject from an integrated value of G signals inputted to the AE/AWB detecting part 224 and, based on the result, controls an iris value of the iris I, electric charge accumulation time (corresponding to a shutter speed) at the image pickup device 202, light-emitting time of the flash 240, etc.

An AF detecting part 222 is a portion which performs a contrast AF process or a phase-difference AF process. To perform a contrast AF process, the focus lens FL in a lens barrel is controlled so that an AF evaluation value indicating a focused state calculated by integrating high-frequency components of image data in a predetermined focus region is maximum. Also, to perform a phase-difference AF process, the focus lens FL in the interchangeable lens 300 is controlled so that a defocus amount find from a phase difference of image data of main pixels and sub-pixels in a predetermined focus region of the image data is 0.

When the AE operation and the AF operation end and the release button 220-1 pressed down in a second stage (pressed all the way down), the flash 240 emits light for a predetermined time under the control via the flash control part 238. Also, based on a read signal applied from an image-pickup-device control part 201, signal charges accumulated in the image pickup device 202 is read as a voltage signal according to the signal charges, and is applied to an analog signal processing part 203. The analog signal processing part 203 samples and holds R, G, and B signals of respective pixels by a correlated double sampling process on the voltage signal outputted from the image pickup device 202, amplifies the resultant signal, and then applies the amplified signal to an A/D converter 204. The A/D converter 204 converts the sequentially-inputted analog R, G, and B signals to digital R, G, and B signals for output to an image input controller 205.

Image data outputted from the image input controller 205 is inputted to a digital signal processing part 206, where a predetermined signal process is performed such as an offset process, a gain control process including white balance correction and sensitivity correction, a gamma correction process, and a YC process and, via write/read in and from a VRAM 230, the resultant signal is encoded by a display control part 210 for output to a monitor 212. With this, a subject image is displayed on the monitor 212.

Also, image data outputted from the A/D converter 204 in response to the full press of the release button 220-1 is inputted from the image input controller 205 to an SDRAM (memory) 232 and temporarily stored therein. After temporary storage into the SDRAM 232, via a predetermined signal process such as the gain control process, the gamma correction process, and the YC process and a compressing process to a JPEG (joint photographic experts group) format by a compression/decompression processing part 208, an image file is generated. That image file is read by a media control part 234 and recorded on a memory card 236. The image recorded on the memory card 236 can be replayed and displayed on the monitor 212 by operating the replay button of the operating part 220.

<Camera Body-Interchangeable Lens Communications>

Communications between the camera body 200 and the interchangeable lens 300 are described. The camera body 200 and the interchangeable lens 300 communicate with each other via the body mount 246 and the mount communicating part 250 of the camera body 200, the lens mount 346 and the mount communicating part 350 of the interchangeable lens 300, and terminals provided to the body mount 246 and the lens mount 346, thereby transmitting and receiving driving instructions. Driving instructions includes a control target (zoom lens ZL/focus lens FL/iris I), driving mode, numerical values (such as target positions of the zoom lens ZL and the focus lens FL and an iris value of the iris I), and an excited state after completion of driving. In addition to the above, communications are made between the camera body 200 and the interchangeable lens 300 for transmission of various control statuses (such as lens driving start/completion notifications) via a terminal for control status communications.

Also, as will be described in detail, when the camera body 200 is powered up and the body mount 246 of the camera body 200 and the lens mount 346 of the interchangeable lens 300 are coupled together (when the interchangeable lens 300 is mounted on the camera body 200), lens information is obtained via communication from the camera CPU 214 and the lens CPU 340 to perform a check process regarding compatibility between the camera body 200 and the interchangeable lens 300 (compatibility check process).

<Compatibility Check Process>

In the following, description is made regarding a compatibility check process, mainly according to a flowchart of a process procedure of the camera CPU 214.

Figure 3:
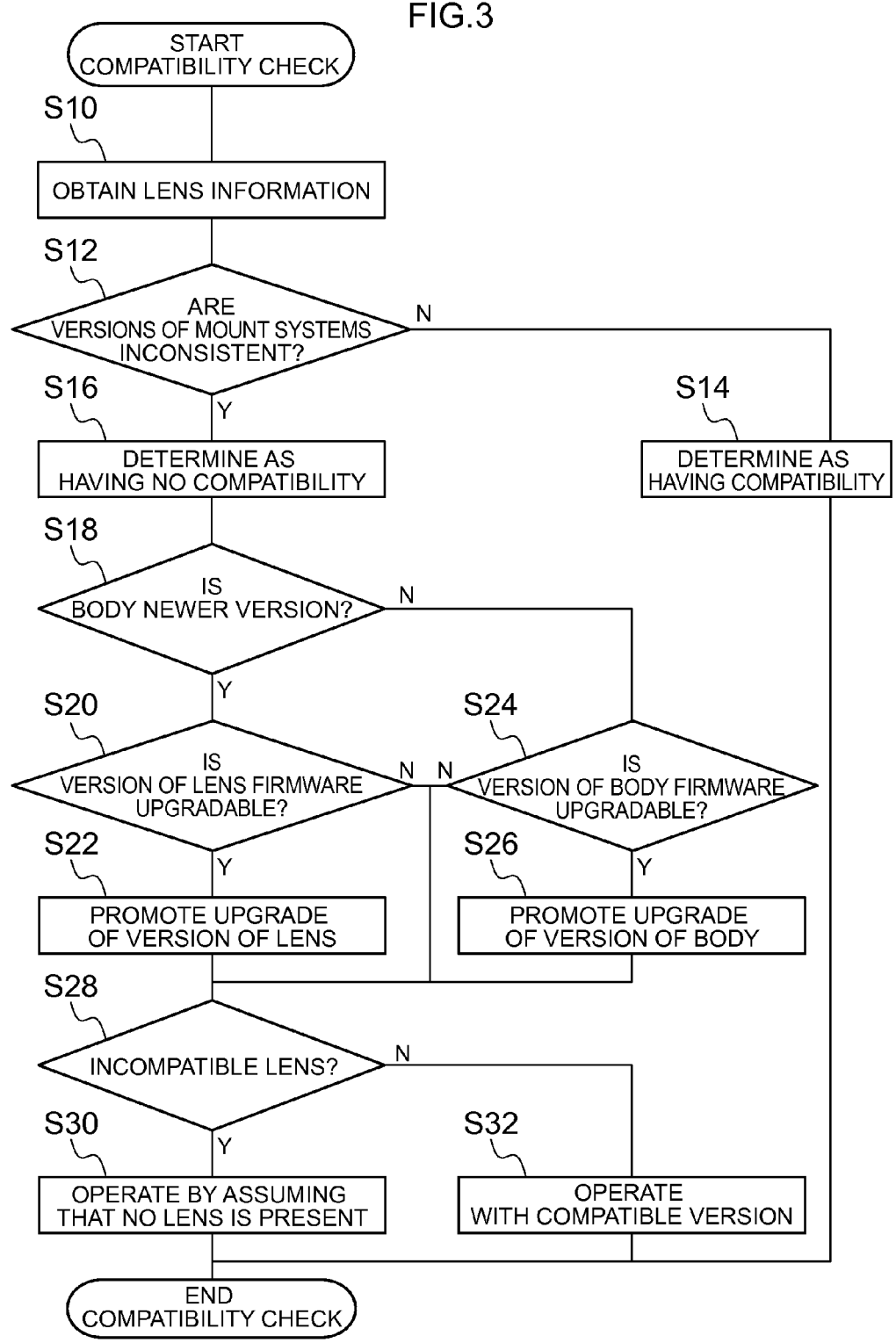
FIG. 3 is a flowchart of an entire compatibility check process in a camera CPU.

FIG. 3 is a flowchart of an entire compatibility check process in the camera CPU 214.

When powered up with the interchangeable lens 300 mounted on the camera body 200 or when the interchangeable lens 300 is mounted on the camera body 200 as the camera CPU 214 is being powered up, the camera CPU 214 starts a compatibility check process from step S10 described below.

At step S10, the camera CPU 214 acting as lens type information obtaining means, mount system version obtaining means, and lens firmware version obtaining means transmits a lens information obtainment command to the lens CPU 340 and obtains from the lens CPU 340 various information about the interchangeable lens 300 as lens information, such as the product name (model) and optical and electrical specifications of the interchangeable lens 300, stored in the ROM (the ROM 344 of FIG. 2) in the interchangeable lens 300. Then, to various variables regarding the lens information prepared in advance in a program of the camera CPU 214, data (values) based on the lens information obtained from the lens CPU 340 are set (substituted). Also, similarly, the camera CPU 214 also acting as body mode information obtaining means and body firmware version obtaining means reads, as body information, the information about the body 200 such as the product name (model) and optical and electrical specifications of the body 200, stored in the ROM (the flash ROM 226 or the ROM 228 of FIG. 2) in the camera body 200 (hereinafter referred to as the body 200), and sets (substitutes) data (values) based on the body information to various variables regarding the body information prepared in advance in a program of the camera CPU 214. After this process, the process proceeds to step S12.

In FIG. 4, types of information stored in the ROM in the interchangeable lens 300 as lens information are exemplarily depicted in an "item" field, names of variables (variable names) to which the values of information are respectively set are exemplarily depicted in a "variable" field, and names of variables indicating addresses in the ROM where the values of information are respectively stored are exemplarily depicted in a "referent address" field.

Also, in FIG. 5, types of information stored in the ROM in the body 200 as body information are exemplarily depicted in an "item" field, names of variables to which the values of information are respectively set are exemplarily depicted in a "variable" field, and variable names indicating addresses in the ROM where the values of information are respectively stored are exemplarily depicted in a "referent address" field.

While the variable names of each of the body information and the lens information depicted in FIG. 4 and FIG. 5 are assumed to be used commonly by the camera CPU 214 in the body 200 and the lens CPU 340 of the interchangeable lens 300, a different variable name may be used in a program to be executed by each of the camera CPU 214 and the lens CPU 340.

In FIG. 4 and FIG. 5, depicted as types of the lens information and types of the body information are a product name, firmware major version, firmware minor version, mount system major version, and mount system minor version.

The product name is information specifying the types (models) of the body 200 and the interchangeable lens 300 and, for example, a different number is assigned to each model as product name data. The data of the product names of the body 200 and the interchangeable lens 300 are set to variables Body_Name and Lens_Name, respectively.

One set of these firmware major version and the firmware minor version represents one version of the firmware. For example, when the specifications of the mount system are changed on a massive scale, the value indicating the firmware major version is increased. When the specifications are changed only on a small scale, the value indicating the firmware minor version (firmware version) is increased. Data of the firmware major version and the firmware minor version of the body 200 are set to variables Body_FMMajorVer and Body_FMMinorVer, respectively, and data of the firmware major version and the firmware minor version of the interchangeable lens 300 are set to variables Lens_FMMajorVer and Lens_FMMinorVer, respectively.

One set of these mount system major version and mount system minor version represents one version of the mount system (mount system version). The mount system version represents a specification of the mount system for the body 200 to recognize the interchangeable lens 300 and make it usable, representing a general version in which a new numerical value is added when a specification regarding any component among components such as, in addition to firmware, a communication protocol between the body 200 and the interchangeable lens 300, various data (such as characteristic data for use in control and image processing), programs, data, hardware, etc., required in a mount system such as various circuits.

When the mount system version of the body 200 and the mount system version of the interchangeable lens 300 are consistent with each other, this means that the interchangeable lens 300 is ensured as a formally compatible lens having compatibility with the body 200.

As with the firmware version, in this mount system version, for example, when the specifications of the mount system are changed on a massive scale, the value indicating the mount system major version is increased. When the specifications are changed only on a small scale, the value indicating the mount system minor version is increased. Data of the mount system major version and the mount system minor version of the body 200 are set to variables Body_MountMajorVer and Body_MountMinorVer, respectively, and data of the mount system major version and the mount system minor version of the interchangeable lens 300 are set to variables Lens_MountMajorVer and Lens_MountMinorVer, respectively.

Note that the firmware version and the mount system version can be represented by, for example, taking the value of each of the major version and the minor version as an integer value and taking the value of the major version as a value of an integer portion as it is and the value of the minor version as a value of a decimal part of a predetermined number of digits. When represented as such, a newer version (upper version) has a larger value. Also, the representation of the firmware version and the mount version is not restricted to that according to the present embodiment, and may be any as long as it is possible to recognize whether the version is old or new.

Figure 6:
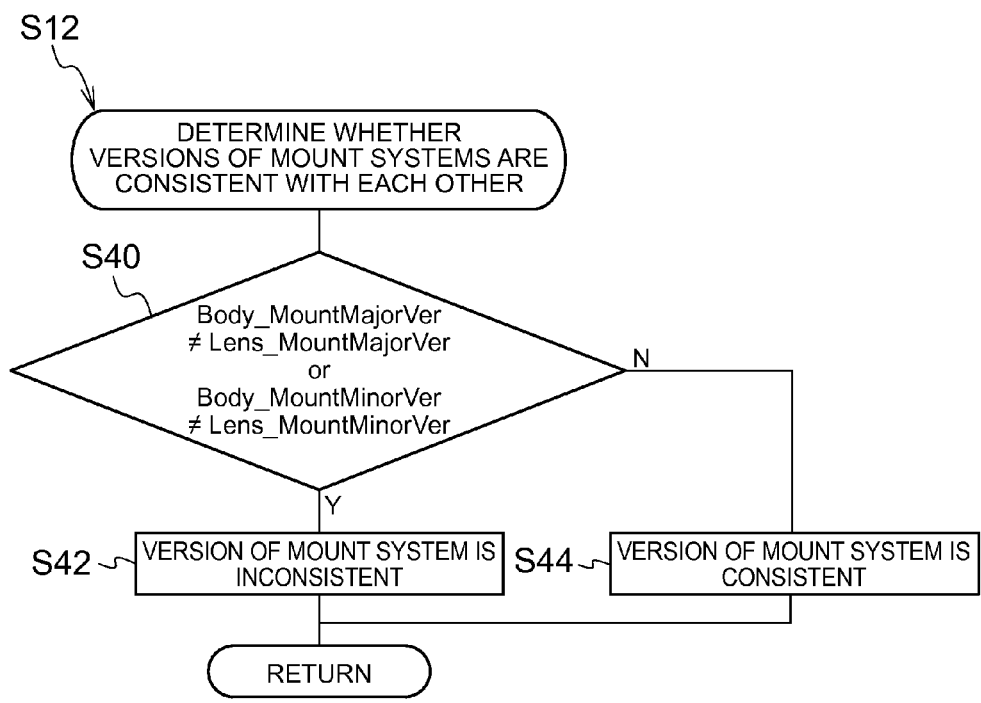
FIG. 6 is a flowchart of a specific procedure of process of the camera CPU at step S12 of FIG. 3.

At step S12, it is determined whether the mount system versions of the body 200 and the interchangeable lens 300 are inconsistent with each other A determination as to whether the mount system versions of the body 200 and the interchangeable lens 300 are inconsistent with each other is made as a flowchart depicted in FIG. 6.

At step S40 in the flowchart of FIG. 6, it is determined whether the mount system version of the body 200 and the mount system version of the interchangeable lens 300 are inconsistent with each other. Specifically, a determination condition is set such that value of the variable Body_MountMajorVer of the mount system major version of the body 200 and the value of the variable Lens_MountMajorVer of the mount system major version of the interchangeable lens 300 are inconsistent with each other (Body_MountMajorVer≠Lens_MountMajorVer) or the value of the variable Body_MountMinorVer of the mount system minor version of the body 200 and the value of the variable Lens_MountMinorVer of the mount system minor version of the interchangeable lens 300 are inconsistent with each other (Body_MountMinorVer≠Lens_MountMinorVer), and it is determined whether this determination condition is satisfied.

When the above-described determination condition is satisfied, the process proceeds to step S42, determining that the mount system versions are inconsistent with each other. Then, the process proceeds to step S16 of FIG. 3.

When the above-described determination condition is not satisfied, the process proceeds to step S44, determining that the mount system versions are consistent with each other. Then, the process proceeds to step S14 of FIG. 3.

Note that, in place of the above-described determination condition, a determination condition may be set such that the mount system major versions of the body 200 and the interchangeable lens 300 are consistent with each other and their mount system minor versions are consistent with each other, and it may be determined that the mount system versions are consistent with each other when the determination condition is satisfied and it may be determined that the mount system versions are inconsistent with each other when the determination condition is not satisfied.

At step S14, it is determined that the interchangeable lens 300 mounted on the body 200 is a formally compatible lens having compatibility as an interchangeable lens normally operating with respect to the body 200. Then, the process of the flowchart of compatibility check ends without performing any procedures for ensuring a normal operation.

At step S16, it is determined that the interchangeable lens 300 mounted on the body 200 is an incompatible lens with a possibility of not normally operating with respect to the body 200, and then the process proceeds to step S18.

At step S18, it is determined whether the mount system version of the body 200 is a version newer than the mount system version of the interchangeable lens 300. This determination is made as in a flowchart of FIG. 7.

Figure 7:
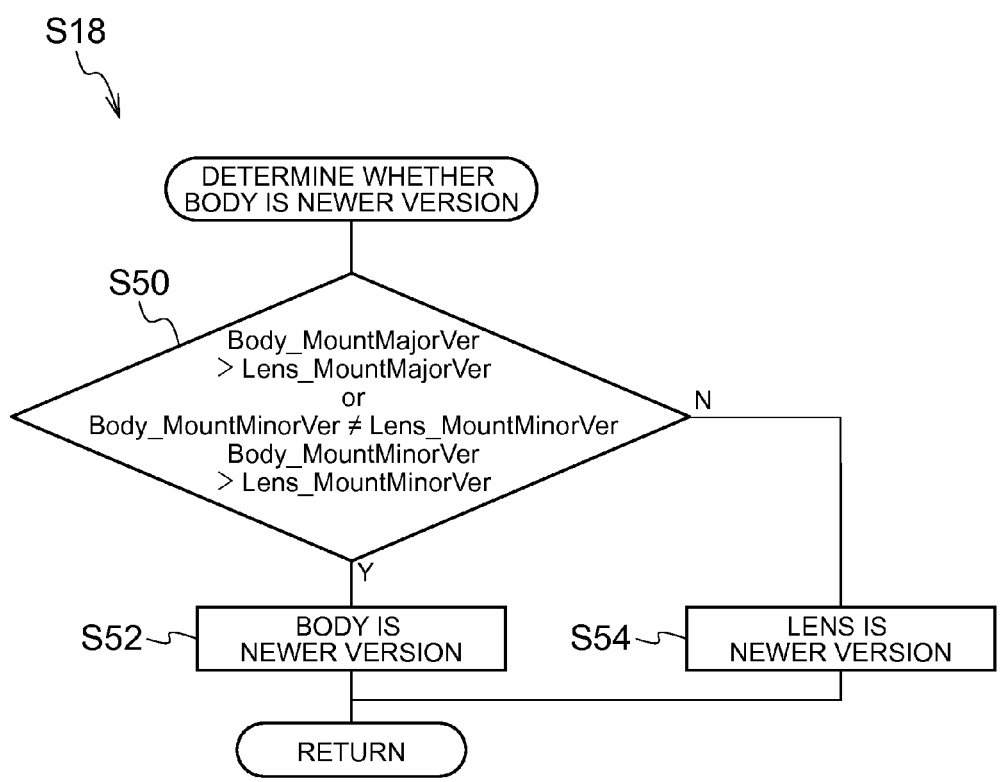
FIG. 7 is a flowchart of a specific procedure of process of the camera CPU at step S18 of FIG. 3.

At step S50 in the flowchart of FIG. 7, a determination condition is set such that the value of the variable Body_MountMajorVer of the mount system major version of the body 200 is larger than the value of the variable Lens_MountMajorVer of the mount system major version of the interchangeable lens 300 (Body_MountMajorVer>Lens_MountMajorVer) or, when Body_MountMajorVer=Lens_MountMajorVer, the value of the variable Body_MountMinorVer of the mount system minor version of the body 200 is larger than the value of the variable Lens_MountMinorVer of the mount system minor version of the interchangeable lens 300 (Body_MountMinorVer>Lens_MountMinorVer), and it is determined whether this determination condition is satisfied.

When the above-described determination condition is satisfied, the process proceeds to step S52, determining that the mount system version of the body 200 is a newer version than the mount system version of the interchangeable lens 300. Then, the process proceeds to step S20 of FIG. 3.

When the above-described determination condition is not satisfied, the process proceeds to step S54, determining that the mount system version of the interchangeable lens 300 is a newer version than the mount system version of the body 200. Then, the process proceeds to step S24 of FIG. 3.

At step S20 of FIG. 3, it is determined whether the version of the firmware of the interchangeable lens 300 can be upgradable.

Here, in the ROM of the body 200, compatibility information is stored for each model of the interchangeable lens (compatible lens) effectively corresponding to the body 200. A compatible lens effectively corresponding to the body 200 is an interchangeable lens capable of ensuring at least a minimum required operation by operating the body 200 and the compatible lens on firmware of any one of firmware versions. By contrast, an incompatible lens is an interchangeable lens incapable of ensuring at least a minimum required operation even though firmware of any one of firmware versions is used.

At this step S20, since the mount system version of the body 200 is newer than the mount system version of the interchangeable lens 300, if the interchangeable lens 300 is a compatible lens, the compatibility information corresponding to the model of the interchangeable lens 300 is also stored in the ROM of the body 200.

On the other hand, the compatibility information is now described. In the firmware of the present embodiment causing the body 200 and a compatible lens to operate, with a firmware version registered in the ROM as body information and lens information being taken as a present version, the present version can be switched to one or plurality of old versions older than the present version.

And, the compatibility information is information indicating the presence or absence of compatibility between each of versions (the present version and the old version) to which the firmware of the firmware version (the present version) of the body 200 is switchable and each of versions (the present version and the old version) to which the firmware of the firmware version (the present version) of a compatible lens is switchable. This compatibility information is created for each firmware version allowing the compatible lens to operate and published as firmware, and is further created for each model of the compatible lens and stored in the ROM of the body 200.

Figure 8:
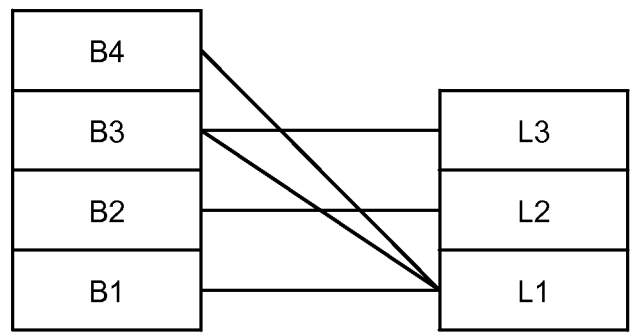
FIG. 8 is a conceptual diagram of compatibility information.

FIG. 8 depicts a conceptual diagram of compatibility information corresponding to the firmware of a predetermined firmware version of a compatible lens of a predetermined model. In the drawing, B1 to B4 represent versions to which the firmware of the body 200 is switchable. And, the versions are sequentially renewed from B1 to B4, and B4 represents the present version of the latest. On the other hand, L1 to L3 represent versions to which the firmware of the compatible lens is switchable. And, the versions are sequentially renewed from L1 to L3, and L3 represents the present version of the latest. Between these versions B1 to B4 and versions L1 to L3, versions having compatibility with each other are connected via a line. According to this, for example, a set of the version B4 and the version L1, a set of the version B3 and the version L3, and a set of the version B3 and the version L1 are versions having compatibility with each other. As such, the compatibility information indicating the presence or absence of compatibility between the switchable versions of the firmware of the body 200 and the switchable versions of the firmware of the compatible lens is stored in a predetermined format.

Figure 9:
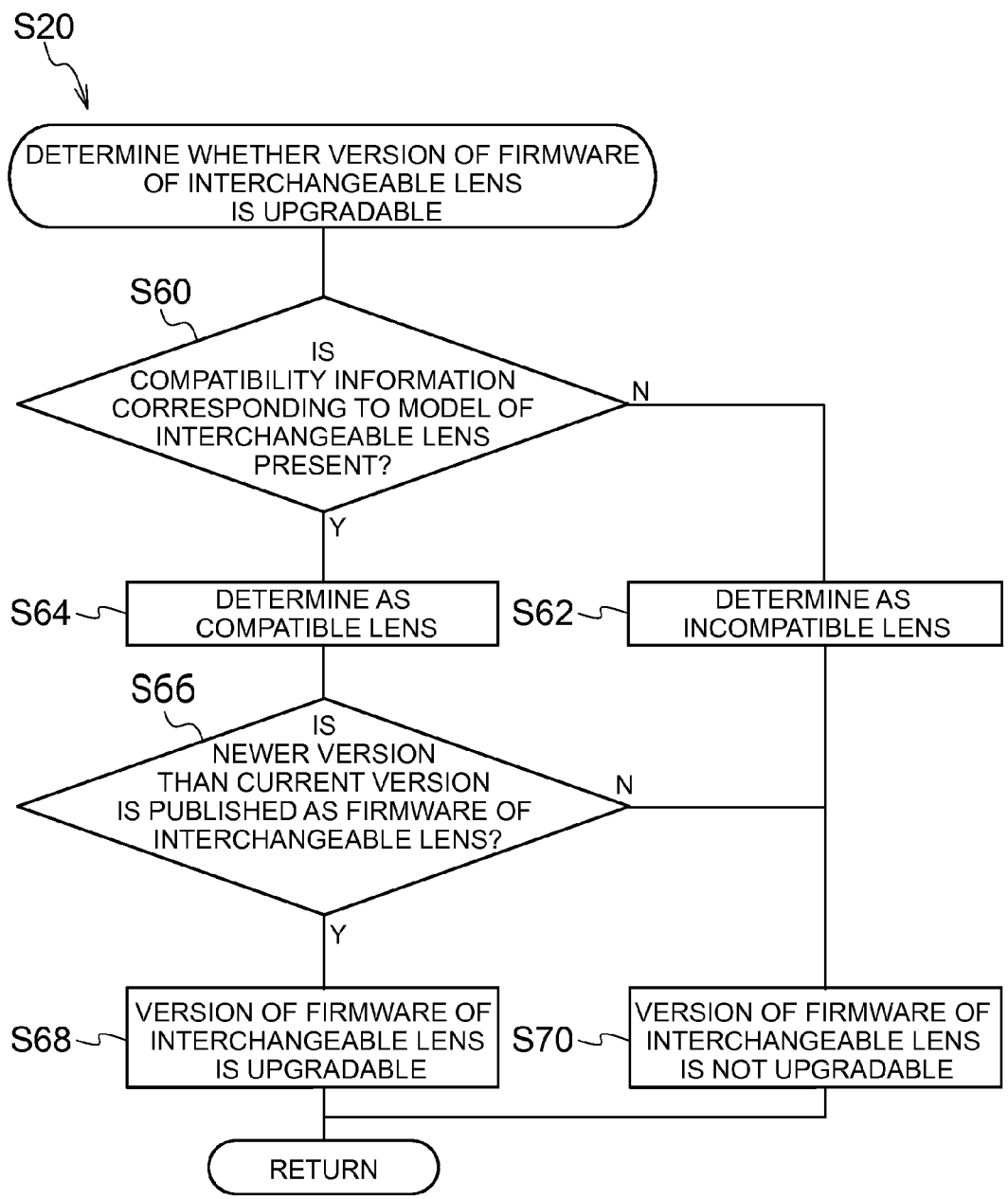
FIG. 9 is a flowchart of a specific procedure of process of the camera CPU at step S20 of FIG. 3.

A determination as to whether the version of the firmware of the interchangeable lens 300 at step S20 of FIG. 3 is made as depicted in a flowchart of FIG. 9 by using compatibility information stored in the ROM of the body 200.

In the flowchart of FIG. 9, it is determined at step S60 whether compatibility information corresponding to the variable Lens_Name of the product name of the interchangeable lens 300 is present in the ROM of the body 200, that is whether the model of the interchangeable lens 300 is registered as a compatible lens.

When it is determined by the above-described determination that the model is not registered as a compatible lens, the process proceeds to step S62, where it is determined that the interchangeable lens 300 mounted on the body 200 is an incompatible lens. Then, the process proceeds to step S70, where it is determined that the version of the firmware of the interchangeable lens 300 is not upgradable, and then the process proceeds to step S28.

When it is determined by the above-described determination at step S60 that the model is registered as a compatible lens, the process proceeds to step S64, where it is determined that the interchangeable lens 300 mounted on the body 200 is a compatible lens. Then, the process proceeds to step S66.

At step S66, the camera CPU 214 acting as determining means which determines whether a new version of the lens firmware is present determines whether a newer version than the current firmware version is published as firmware of the interchangeable lens 300. That is, it is determined whether compatibility information corresponding to a version newer than the firmware version of the interchangeable lens 300 is present in compatibility information corresponding to the value of the variable Lens_Name of the product name of the interchangeable lens 300. Specifically, it is determined whether compatibility information corresponding to firmware major version larger than the value of the variable Lens_FWMajorVer of the firmware major version of the interchangeable lens 300 is present or whether compatibility information corresponding to firmware minor version consistent with the value of the variable Lens_FWMajorVer of the firmware major version of the interchangeable lens 300 and larger than the value of the variable Lens_FWMinorVer of the firmware minor version of the interchangeable lens 300 is present. When a positive result is obtained in this determination, the process proceeds to step S68, where it is determined that the version of the firmware of the interchangeable lens 300 is upgradable. Then, the process proceeds to step S22 of FIG. 3.

On the other hand, when a negative result is obtained in the above-described determination, the process proceeds to step S70, where it is determined that the version of the firmware of the interchangeable lens 300 is not upgradable. Then, the process proceeds to step S28 of FIG. 3.

Note that, the determination at step S60 may be made by, in place of using the compatibility information, registering information of the model of the lens compatible with the body 200 in the ROM of the body 200 and determining whether the mode of the interchangeable lens 300 is registered as a model of a compatible lens.

Also, the determination at step S66 may be made by registering, in the ROM of the body 200, information indicating a published interchangeable lens firmware version compatible with the firmware of the body 200 and determining whether a newer firmware version than the firmware version of the interchangeable lens 300 is present in the information registered in that ROM.

At step S22 of FIG. 3, a display for prompting upgrade of the version of the firmware of the interchangeable lens 300 is made on the monitor 212 (refer to FIG. 2) of the body 200 as notifying means. Here, when the number of versions newer than the current firmware version of the interchangeable lens 300 is one, that version is displayed. When a plurality of such versions are present, the latest version may be displayed, or the plurality of these versions may be displayed. After this process, the process proceeds to step S28.

Note that when it is determined at step S20 that the version of the firmware of the interchangeable lens 300 is not upgradable, the process proceeds to step S28 without making a display for promoting upgrade of the version of the interchangeable lens 300. However, a display indicating that the version is not upgradable may be made on the monitor 212. In more detail, in a flowchart of FIG. 9 depicting details of the process at step S202, when it is determined at step S62 that the lens is an incompatible lens, a display indicating that the lens is an incompatible lens may be made on the monitor 212. When it is determined at step S64 that the lens is a compatible lens but, after the determination at step S66, it is determined at step S70 that the version of the firmware of the interchangeable lens 300 is not upgradable, a display indicating that the lens is a compatible lens but the version of the firmware is not upgradable may be made on the monitor 212.

Also, any method of upgrading (updating) the version of the firmware of the interchangeable lens 300 can be used. For example, it is possible to update the firmware of the interchangeable lens 300 by recording update data of the firmware in the memory card 236 inserted in the body 200 by using a personal computer or the like and transmitting the update data to the interchangeable lens 300 by a predetermined operation.

Furthermore, after promoting upgrade of the version of the firmware of the interchangeable lens 300 as described above, the firmware of the interchangeable lens 300 may be updatable with the upgrade data transmitted from the body 200 to the interchangeable lens 300 according to the selection by the user.

Still further, the method of promoting version upgrade is not restricted to a display on the monitor 212, and any notifying means using a display by another display means or a sound can be used.

On the other hand, when it is determined at step S18 that the mount system version of the body 200 is not a newer version than the mount system version of the interchangeable lens 300, that is, when it is determined that the mount system version of the interchangeable lens 300 is a newer version than the mount system version of the body 200, the process proceeds to step S24.

At step S24, it is determined whether the version of the firmware of the body 200 is upgradable.

Here, in the ROM of the interchangeable lens 300, compatibility information regarding each model of the body (compatible body) effectively corresponding to the interchangeable lens 300 as a compatible lens is stored. As with the compatibility information stored in the ROM of the body 200, the compatibility information stored in the ROM of the interchangeable lens 300 is information indicating the presence or absence of compatibility between each of versions (the present version and the old version) to which the firmware of the firmware version (the present version) of the compatible body is switchable and each of versions (the present version and the old version) to which the firmware of the firmware version (the present version) of the interchangeable lens 300 is switchable. And, this compatibility information is created for each firmware version allowing the compatible body to operation and published as firmware, and is further created for each model of the compatible body and stored in the ROM of the body 200.

Figure 10:
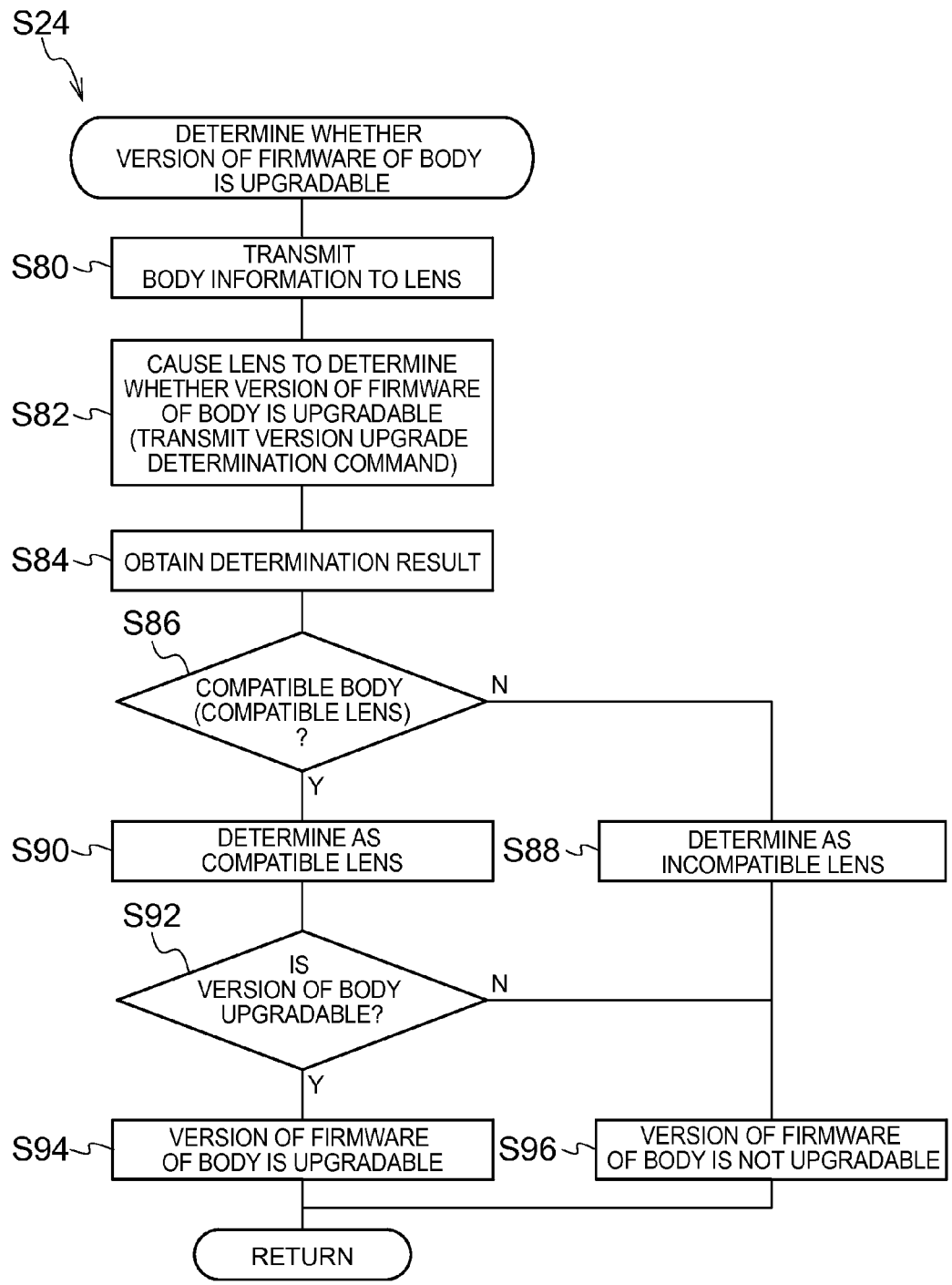
FIG. 10 is a flowchart of a specific procedure of process of the camera CPU at step S24 of FIG. 3.
Figure 11:
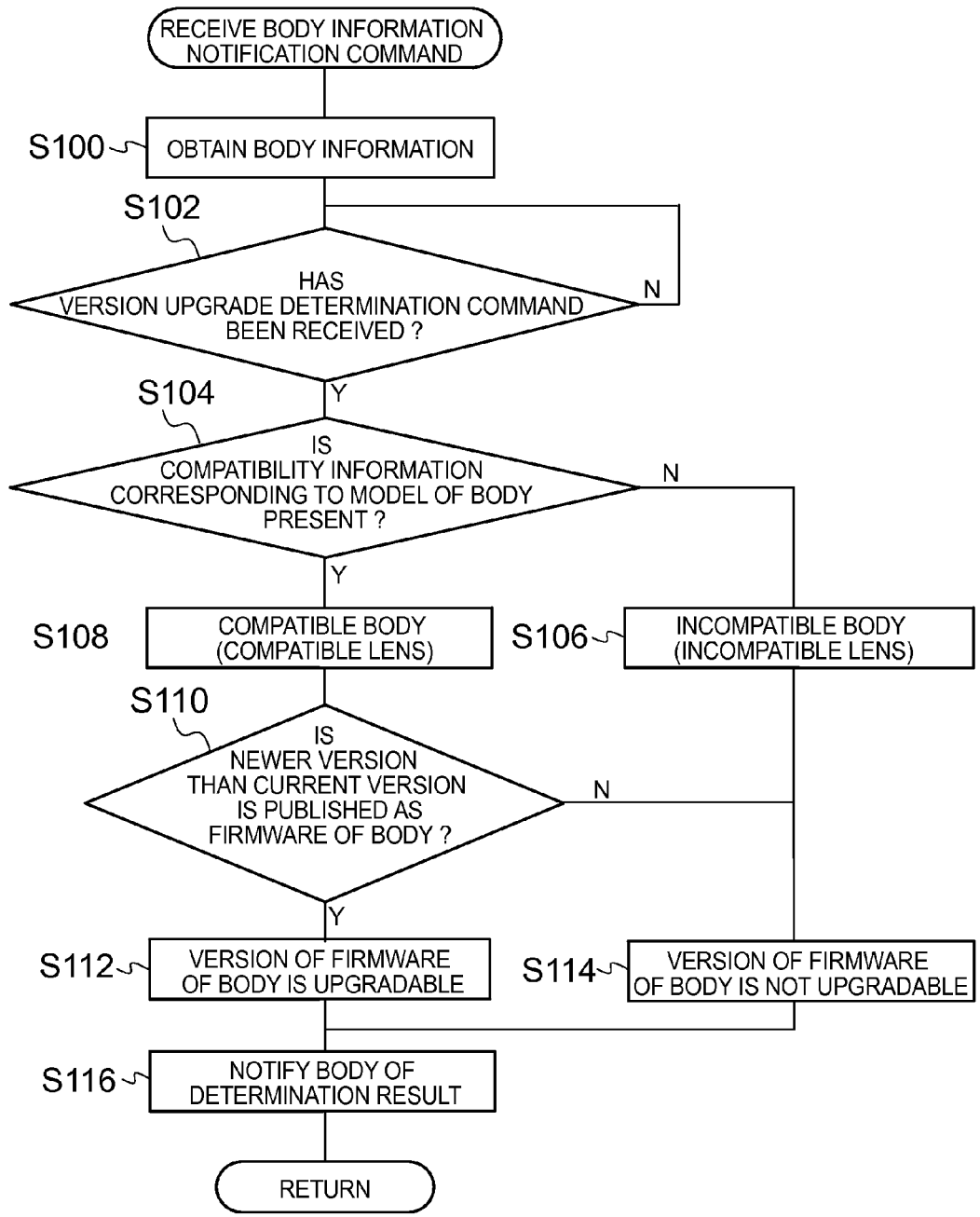
FIG. 11 is a flowchart of a specific procedure to be performed by an interchangeable lens (lens CPU) between step S80 and step S84 of FIG. 10.

The determination at step S24 as to whether the version of the firmware of the body 200 is upgradable is made by using the compatibility information stored in the ROM of the interchangeable lens 300 as flowcharts of FIG. 10 and FIG. 11.

At step S80, the camera CPU 214 transmits a body information notification command to the lens CPU 340 to transmit the above-described body information stored in the ROM in the body 200 and depicted in FIG. 5 to the lens CPU 340. Then, the process proceeds to step S82.

At step S82, a version upgrade determination command is transmitted to the lens CPU 340, thereby causing the interchangeable lens 300 (the lens CPU 340) to determine whether the version of the firmware of the body 200 is upgradable. Then, the process proceeds to step S84.

At step S84, the determination result is obtained from the lens CPU 340. Then, the process proceeds to step S86.

Here, a process procedure to be performed by the lens CPU 340 receiving the body information notification command from the camera CPU 214 at step S80 until transmitting the determination result at step S84 to the camera CPU 214 is described by using a flowchart of FIG. 11.

In the flowchart of FIG. 11, at step S100, after receiving the body information notification command transmitted from the camera CPU 214, the lens CPU 340 subsequently obtains body information transmitted from the camera CPU 214. Then, as with the process in the camera CPU 214 at step S10 of FIG. 3, to various variables regarding the body information prepared in advance in a program of the lens CPU 340, data (values) based on the body information obtained from the camera CPU 214 are set (substituted). Also, similarly, the lens information stored in the ROM of the interchangeable lens 300 is read, and data (values) based on the lens information are set (substituted) to various variables regarding the lens information prepared in advance in the program of the lens CPU 340. After this process, the process proceeds to step S102.

At step S102, it is determined whether a version upgrade determination command has been received from the camera CPU 214. The determining process at step S102 is repeated until a version upgrade determination command is received. On the other hand, when a version upgrade determination command is received, the process proceeds to step S104.

At step S104, it is determined whether compatibility information corresponding to the value of the variable Body_Name of the product name of the body 200 is present in the ROM of the interchangeable lens 300, that is, whether the model of the body 200 is registered as a compatible body.

When it is determined in the above-described determination that the body is not registered as a compatible body, the process proceeds to step S106, where it is determined that the body 200 where the interchangeable lens 300 is mounted is an incompatible body, that is, the interchangeable lens is a lens incompatible with the body 200. Then, the process proceeds to step S114, where it is determined that the version of the firmware of the body 200 is not upgradable. Subsequently, the process proceeds to step S116, and the determination result, that is, that the body 200 is an incompatible body (the interchangeable lens 300 is an incompatible lens) and the version of the firmware of the body 200 is not upgradable, is transmitted to the camera CPU 214 of the body 200. Note that in the case of an incompatible body, it is inevitably not determined that the version of the firmware of the body 200 is upgradable, and therefore only the determination that the body 200 is an incompatible body (the interchangeable lens 300 is an incompatible lens) may be transmitted to the camera CPU 214.

When it is determined at the above-described determination at step S104 that the body is registered as a compatible body, the process proceeds to step S108, where it is determined that the body 200 where the interchangeable lens 300 is mounted is a compatible body (the interchangeable lens 300 is a compatible lens). Then, the process proceeds to step S110.

At step S110, the lens CPU 340 acting as determining means which determines whether a new version of the body firmware is present determines whether a version newer than the current firmware version is published as firmware of the body 200. That is, it is determined whether compatibility information corresponding to the version newer than the firmware version of the body 200 is present in the compatibility information corresponding to the value of the variable Body_Name of the product name of the body 200 stored in the ROM of the interchangeable lens 300. Specifically, it is determined whether compatibility information corresponding to the firmware major version larger than the value of the variable Body_FWMajorVer of the firmware major version of the body 200 is present or whether compatibility information corresponding to firmware minor version consistent with the value of the variable Body_FWMajorVer of the firmware major version of the body 200 and larger than the value of the variable Body_FWMinorVer of the firmware minor version of the body 200 is present. When a positive result is obtained in this determination, the process proceeds to step S112, where it is determined that the version of the firmware of the body 200 is upgradable. Then, the process proceeds to step S116, where the determination result, that is, the result indicating that the body 200 is a compatible body (the interchangeable lens 300 is an incompatible lens) and the version of the firmware of the body 200 is upgradable, is transmitted to the camera CPU 214 of the body 200.

On the other hand, when a negative result is obtained in the above-described determination, the process proceeds to step S114, where it is determined that the version of the firmware of the body 200 is not upgradable. Then, the process proceeds to step S116, where the determination that the body 200 is a compatible body (the interchangeable lens 300 is a compatible lens) and the version of the firmware of the body 200 is not upgradable is transmitted to the camera CPU 214 of the body 200.

Note that, the determination at step S104 may be made by, in place of using the compatibility information, registering information of the model of the body compatible with the interchangeable lens 300 in the ROM of the interchangeable lens 300 and determining whether the mode of the body 200 is registered as a model of a compatible body.

Also, the determination at step S110 may be made by registering, in the ROM of the interchangeable lens 300, information indicating a published body firmware version compatible with the firmware of the interchangeable lens 300 and determining whether a newer firmware version than the firmware version of the body 200 is present in the information registered in that ROM.

When the determination result transmitted from the lens CPU 340 in the above-described manner is obtained by the camera CPU 214 at step S84 in the flowchart of FIG. 10, the camera CPU 214 next proceeds to step S86.

At step S86, it is determined whether the determination result from the lens CPU 340 indicates a compatible body (compatible lens).

When it is determined in the above-described determination that the body is not a compatible body (the lens is not a compatible lens), the process proceeds to step S88, where it is determined that the interchangeable lens 300 is an incompatible lens. Then, the process proceeds to step S96, where it is determined that the version of the firmware of the body is not upgradable, and the process proceeds to step S28 of FIG. 3.

When it is determined in the above-described determination at step S86 in the above-described determination that the body is a compatible body (the lens is a compatible lens), the process proceeds to step S90, where it is determined that the interchangeable lens 300 is a compatible lens. Then, the process proceeds to step S92.

At step S92, it is determined whether the determination result from the lens CPU 340 indicates that the version of the firmware of the body 200 is upgradable.

When a positive result is obtained in this determination, the process proceeds to step S94, where it is determined that the version of the firmware of the body 200 is not upgradable. Then, the process proceeds to step S26.

On the other hand, when a negative result is obtained in the above-described determination, the process proceeds to step S96, where it is determined that the version of the firmware of the body 200 is not upgradable. Then, the process proceeds to step S28 of FIG. 3.

At step S26 of FIG. 3, a display for prompting upgrade of the version of the firmware of the body 200 is made on the monitor 212 of the body 200 as notifying means. Here, when the number of versions newer than the current firmware version of the body 200 is one, that version is displayed. When a plurality of such versions are present, the latest version may be displayed, or the plurality of these versions may be displayed. In this case, at step S84 of FIG. 10, as the determination result obtained by the camera CPU 214 from the lens CPU 340, that is, as the determination result transmitted by the lens CPU 340 to the camera CPU 214 at step S116 of FIG. 11, information about a version newer than the current firmware version of the body 200 is included. After the process at step S26, the process proceeds to step S28.

Note that when it is determined at step S24 that the version of the firmware of the body 200 is not upgradable, the process proceeds to step S28 without making a display for promoting upgrade of the version of the body 200. However, a display indicating that the version is not upgradable may be made on the monitor 212. In more detail, in the flowchart of FIG. 10 depicting details of the process at step S24, when it is determined at step S88 that the lens is an incompatible lens (the body is an incompatible body), a display indicating that the lens is an incompatible lens (the body is an incompatible body) may be made on the monitor 212. When it is determined at step S90 that the lens is a compatible lens (the body is a compatible body) but, after the determination at step S92, it is determined at step S96 that the version of the firmware of the body 200 is not upgradable, a display indicating that the body is a compatible body (the lens is a compatible lens) but the version of the firmware is not upgradable may be made on the monitor 212.

Also, any method of upgrading (updating) the version of the firmware of the body 200 can be used. For example, update data of the firmware is recorded on the memory card 236 inserted in the body 200 by using a personal computer or the like, and the firmware of the body 200 can be updated with that update data by a predetermined operation. Also, it is possible to update the firmware of the body 200 by storing update data in the memory of the interchangeable lens 300 and transmitting the update data to the body 200.

Furthermore, after promoting upgrade of the version of the firmware of the body 200 as described above, the firmware of the body 200 may be updatable according to the selection by the user.

Still further, the method of promoting version upgrade is not restricted to a display on the monitor 212, and any notifying means using a display by another display means or a sound can be used.

At step S28, it is determined whether the interchangeable lens 300 is an incompatible lens. When it is determined at step S62 of FIG. 9 or step S88 of FIG. 10 that the lens is an incompatible lens, the process proceeds to step S30. When it is determined at step S64 of FIG. 9 or step S90 of FIG. 10 that the lens is a compatible lens, the process proceeds to step S32.

At step S30, the subsequent process is performed by assuming that the interchangeable lens 300 is not mounted. Then, the compatibility check process ends.

At step S32, the subsequent process is performed by switching each of the firmware of the body 200 and the firmware of the interchangeable lens 300 to specifications of a version with compatibility with each other. Then, the compatibility check process ends.

Here, when it is determined at step S18 of FIG. 3 that the mount system version of the body 200 is newer than the mount system version of the interchangeable lens 300, as with the determination at step S20, the camera CPU 214 acting as compatible version selecting means and version switching means switches, based on the compatibility information stored in the ROM of the body 200, each of the firmware of the body 200 and the firmware of the interchangeable lens 300 to a version with compatibility.

That is, versions with compatibility with each other between each of switchable versions of the firmware of the body 200 (the present version and the old version) and each of switchable versions of the firmware of the interchangeable lens 300 (the present version and the old version) (combinations of a version of the firmware of the body 200 and a version of the firmware of the interchangeable lens 300) are read from the compatibility information stored in the ROM of the body 200. The compatibility information to be specifically referred to can be selected based on the model (product name) of the interchangeable lens 300 and the firmware version of the interchangeable lens 300.

As a result, when the present version of the firmware of the body 200 and the present version of the firmware of the interchangeable lens 300 have compatibility with each other, the specifications of the present versions are taken without switching any firmware to an old version.

On the other hand, when the present version of the firmware of the body 200 and the present version of the firmware of the interchangeable lens 300 do not have compatibility with each other, any one combination other than the above is selected from out of the combinations of version with compatibility with each other.

For example, when the number of such combinations is one, the versions of that combination are inevitably selected. On the other hand, when a plurality of such combinations are present, switching to a version as new as possible is desired. For example, a combination in which at least one of the version of the firmware of the body 200 and the version of the firmware of the interchangeable lens 300 becomes the latest version is selected. Furthermore, for other versions, a version as new as possible is desirably selected.

Then, the version of the firmware of the body 200 and the version of the firmware of the interchangeable lens 300 are switched to versions selected in the above-described manner. Here, the version of the firmware of the body 200 is switched by the camera CPU 214 itself, and switching of the version of the firmware of the interchangeable lens 300 can be carried out by transmitting a predetermined command from the camera CPU 214 to the lens CPU.

When it is determined at step S18 of FIG. 3 that the mount system version of the body 200 is not a version newer than the mount system version of the interchangeable lens 300, the compatibility information stored in the ROM of the interchangeable lens 300 is used to select versions respectively having compatibility with the firmware of the body 200 and the firmware of the interchangeable lens 300, and switching is made to those versions. The method of selecting versions with compatibility by using the compatibility information is identical to the case in which the compatibility information stored in the ROM of the body 200 is used to perform selection, but its selecting process is performed by the interchangeable lens 300 (the lens CPU 340). Also, the compatibility information to be specifically referred to is selected based on the model (product name) of the body 200 and the firmware version of the body 200.

Then, the version of the firmware of the interchangeable lens 300 is switched by the lens CPU 340 according to its own selection result, and switching of the version of the firmware of the body 200 can be carried out by returning the selection result to the camera CPU 214.

However, by providing necessary information such as compatibility information stored in the ROM of the interchangeable lens 300, the process of selecting a version having compatibility in the body 200 can be performed on a body 200 side even when it is determined at step S18 of FIG. 3 that the mount system version of the body 200 is not a version newer than the mount system version of the interchangeable lens 300. Also, the present invention is not restricted to the above. As step S104 and step S110 of FIG. 11, an entire or part of the process to be performed in the interchangeable lens 300 based on the compatibility information stored in the ROM therein may be performed on the body 200 side. Furthermore, by providing necessary information such as the compatibility information stored in the ROM of the body 200 to the interchangeable lens 300, an entire or part of the process to be performed in the body 200 based on the compatibility information stored in the ROM therein can be performed on an interchangeable lens 300 side.

According to the above-described compatibility check process, even if, for example, the body 200 and the interchangeable lens 300 have a relation of a new type and an old type and do not have compatibility between the present versions of the firmware, as long as the old version has compatibility, the firmware is switched to specifications of that version. Therefore, a minimum operation can be ensured without updating the firmware. Also, if the version of the firmware is upgradable, a notification for promoting version upgrade is provided. Therefore, the user can check the presence or absence of firmware, and can upgrade the firmware at convenience.

What is claimed is:

1. A camera body configuring a camera system including the camera body and an interchangeable lens attachably and detachably mounted on the camera body, the interchangeable lens having lens firmware storage means which has stored therein data of lens firmware of a predetermined version for operating the interchangeable lens, with the predetermined version being taken as a present version, the lens firmware capable of switching to specifications of either one of the present version and one or plurality of old versions older than the present version, the camera body comprising:
body firmware storage means which has stored therein data of body firmware of a predetermined version for operating the camera body, the body firmware capable of switching to specifications of either one of the present version and one or plurality of old versions older than the present version;
compatibility information storage means which has stored therein compatibility information indicating presence or absence of compatibility between each of the present version and the old versions that are switchable of the body firmware stored in the body firmware storage means and each of the present version and the old version that are switchable of the lens firmware stored in the lens firmware storage means;
compatible version selecting means which selects, based on the compatibility information stored in the compatibility information storage means, a version of the body firmware and a version of the lens firmware with mutual compatibility between the present version and the old versions that are switchable of the body firmware stored in the body firmware storage means and the present version and the old versions that are switchable of the lens firmware stored in the lens firmware storage means, the compatible version selecting means selecting, when a plurality of sets of the version of the body firmware and the version of the lens firmware with mutual compatibility are present, versions of a set in which at least one of the version of the body firmware and the version of the lens firmware is a latest version, from out of the sets of these versions; and
version switching means which switches the body firmware for operating the camera body to specifications of the version of the body firmware selected by the compatible version selecting means and switches the lens firmware for operating the interchangeable lens to specifications of the version of the lens firmware selected by the compatible version selecting means when the present version of the body firmware and the present version of the lens firmware do not have compatibility.

2. The camera body according to claim 1, comprising:
determining means which determines, based on the compatibility information stored in the compatibility information storage means, whether a present version newer than the present version of the body firmware version stored in the body firmware storage means or the present version of the lens firmware version stored in the lens firmware storage means is present; and
notifying means which makes a notification for promoting update of the firmware when it is determined by the determining means that the present version newer than the present version of the body firmware version stored in the body firmware storage means or the present version of the lens firmware version stored in the lens firmware storage means is present.

3. A camera system comprising:
a camera body;
a interchangeable lens attachably and detachably mounted on the camera body;
body firmware storage means which has stored therein data of body firmware of a predetermined version for operating the camera body, with the predetermined version being taken as a present version, the body firmware capable of switching to specifications of either one of the present version and one or plurality of old versions older than the present version, the body firmware storage means included in the camera body;
lens firmware storage means which has stored therein data of lens firmware of a predetermined version for operating the interchangeable lens, with the predetermined version being taken as a present version, the lens firmware capable of switching to specifications of either one of the present version and one or plurality of old versions older than the present version, the lens firmware storage means included in the interchangeable lens;
compatibility information storage means which has stored therein compatibility information indicating presence or absence of compatibility between each of the present version and the old versions that are switchable of the body firmware stored in the body firmware storage means and each of the present version and the old version that are switchable of the lens firmware stored in the lens firmware storage means;
compatible version selecting means which selects, based on the compatibility information stored in the compatibility information storage means, a version of the body firmware and a version of the lens firmware with mutual compatibility between the present version and the old versions that are switchable of the body firmware stored in the body firmware storage means and the present version and the old versions that are switchable of the lens firmware stored in the lens firmware storage means, the compatible version selecting means selecting, when a plurality of sets of the version of the body firmware and the version of the lens firmware with mutual compatibility are present, versions of a set in which at least one of the version of the body firmware and the version of the lens firmware is a latest version, from out of the sets of these versions; and
version switching means which switches the body firmware for operating the camera body to specifications of the version of the body firmware selected by the compatible version selecting means and switches the lens firmware for operating the interchangeable lens to specifications of the version of the lens firmware selected by the compatible version selecting means when the present version of the body firmware and the present version of the lens firmware do not have compatibility.

4. The camera system according to claim 3, comprising
determining means which determines, based on the compatibility information stored in the compatibility information storage means, whether a present version newer than the present version of the body firmware version stored in the body firmware storage means or the present version of the lens firmware version stored in the lens firmware storage means is present; and
notifying means which makes a notification for promoting update of the firmware when it is determined by the determining means that the present version newer than the present version of the body firmware version stored in the body firmware storage means or the present version of the lens firmware version stored in the lens firmware storage means is present.

5. The camera system according to claim 3, wherein
the compatibility information storage means includes compatibility information storage means included in the camera body and the compatibility information storage means included in the interchangeable lens,
the compatibility information storage means included in the camera body has stored therein, correspondingly to each of present versions published as lens firmware for operating the interchangeable lens, compatibility information indicating presence or absence of compatibility between each of the present versions and the old versions that are switchable of the lens firmware of each of the present versions and each of the present versions and the old versions that are switchable of the body firmware stored in the body firmware storage means, and the compatibility information storage means included in the interchangeable lens has stored therein, correspondingly to each of present versions published as camera body firmware for operating the camera body, compatibility information indicating presence or absence of compatibility between each of the present versions and the old versions that are switchable of the body firmware of each of the present versions and each of the present versions and the old versions that are switchable of the lens firmware storage means, the compatible version selecting means includes mount system version obtaining means which obtains information about a body mount system version representing specifications on the camera body side of a mount system for mounting the interchangeable lens on the camera body and a lens mount system version representing specifications on the interchangeable lens side thereof, lens firmware version obtaining means which obtains information about the present version of the lens firmware stored in the lens firmware storage means, and body firmware version obtaining means which obtains information about the present version of the body firmware stored in the body firmware storage means, between the body mount system version and the lens mount system version obtained by the mount system version obtaining means, when the body mount system version is newer, the compatibility information corresponding to the present version of the lens firmware obtained by the lens firmware version obtaining means is obtained from the compatibility information storage means included in the camera body and, based on the obtained compatibility information, a version of the body firmware and a version of the lens firmware having the mutual compatibility are selected, and between the body mount system version and the lens mount system version obtained by the mount system version obtaining means, when the lens mount system version is newer, the compatibility information corresponding to the present version of the body firmware obtained by the body firmware version obtaining means is obtained from the compatibility information storage means included in the interchangeable lens and, based on the obtained compatibility information, a version of the body firmware and a version of the lens firmware having the mutual compatibility are selected.

6. The camera system according to claim 5, wherein the compatible version selecting means includes compatible version selecting means included in the camera body and the compatible version selecting means included in the interchangeable lens, the compatible version selecting means included in the camera body has the lens firmware version obtaining means which obtains the present version of the lens firmware from lens information transmitted from the interchangeable lens to the camera body, the compatible version selecting means included in the interchangeable lens has the body firmware version obtaining means which obtains the present version of the body firmware from camera information transmitted from the camera body to the interchangeable lens, between the body mount system version and the lens mount system version obtained by the mount system version obtaining means, when the body mount system version is newer, the version of the body firmware and the version of the lens firmware having the mutual compatibility are selected by the compatible version selecting means included in the camera body, and between the body mount system version and the lens mount system version obtained by the mount system version obtaining means, when the lens mount system version is newer, the version of the body firmware and the version of the lens firmware having the mutual compatibility are selected by the compatible version selecting means included in the interchangeable lens.

7. The camera system according to claim 5, comprising:

determining means which determines, when the body mount system version is newer between the body mount system version and the lens mount system version obtained by the mount system version obtaining means, whether a present version newer than the present version of the lens firmware obtained by the lens firmware version obtaining means is present, based on the compatibility information stored in the compatibility information storage means included in the camera body, and determines, when the lens mount system version is newer between the body mount system version and the lens mount system version obtained by the mount system version obtaining means, whether a present version newer than the present version of the body firmware obtained by the body firmware version obtaining means is present, based on the compatibility information stored in the compatibility information storage means included in the interchangeable lens; and notifying means which makes a notification for promoting update of the lens firmware when it is determined by the determining means that the present version newer than the lens firmware stored in the lens firmware storage means is present, and makes a notification for promoting update of the body firmware when it is determined by the determining means that the present version newer than the body firmware stored in the body firmware storage means is present.

8. The camera system according to claim 5, wherein the compatibility information storage means included in the camera body has stored therein the compatibility information corresponding to each model of an existing interchangeable lens, the compatibility information storage means included in the interchangeable lens has stored therein the compatibility information corresponding to each model of an existing camera body, the compatible version selecting means includes body model information obtaining means which obtains information about the model of the camera body configuring the camera system, and lens model information obtaining means which obtains information about the model of the interchangeable lens configuring the camera system, between the body mount system version and the lens mount system version obtained by the mount system version obtaining means, when the body mount system version is newer, compatibility information corresponding to the model of the interchangeable lens obtained by the lens model information obtaining means is referred to from among the compatibility information stored in the compatibility information storage means included in the camera body, and between the body mount system version and the lens mount system version obtained by the mount system version obtaining means, when the lens mount system version is newer, compatibility information corresponding to the model of the camera body obtained by the body model information obtaining means is referred to from among the compatibility information stored in the compatibility information storage means included in the interchangeable lens.

9. The camera system according to claim 3, wherein when it is determined by the compatible version selecting means that the version of the body firmware and the version of the lens firmware having the mutual compatibility are not present, the camera body is operated as not having the interchangeable lens mounted thereon.

10. A camera body for use in the camera system according to claim 3.

11. An interchangeable lens for use in the camera system according to claim 3.

* * * * *